United States Patent
Liao et al.

(10) Patent No.: US 8,104,898 B2
(45) Date of Patent: Jan. 31, 2012

(54) PROJECTION APPARATUS

(75) Inventors: Chien-Chung Liao, Hsinchu (TW); Chin-Ku Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 536 days.

(21) Appl. No.: 11/877,676

(22) Filed: Oct. 24, 2007

(65) Prior Publication Data
US 2008/0259287 A1  Oct. 23, 2008

(30) Foreign Application Priority Data

Apr. 19, 2007 (TW) .............................. 96113780 A

(51) Int. Cl.
*G03B 21/14* (2006.01)
(52) U.S. Cl. ........................................ 353/38; 353/20
(58) Field of Classification Search .................. 353/38, 353/20
See application file for complete search history.

(56) References Cited

U.S. PATENT DOCUMENTS

| | | | |
|---|---|---|---|
| 5,309,188 A | | 5/1994 | Burstyn |
| 5,774,268 A | * | 6/1998 | Takahashi ..................... 359/630 |
| 6,155,687 A | | 12/2000 | Peterson |
| 6,760,168 B2 | | 7/2004 | Lee |
| 2003/0223044 A1 | * | 12/2003 | Janssen ........................... 353/20 |
| 2004/0046941 A1 | * | 3/2004 | Yamamoto ...................... 353/31 |
| 2006/0139730 A1 | * | 6/2006 | Oehler et al. .................. 359/291 |

FOREIGN PATENT DOCUMENTS

| | | |
|---|---|---|
| CN | 1692310 | 11/2005 |
| EP | 1549081 A1 * | 6/2005 |
| TW | 586020 | 5/2004 |

OTHER PUBLICATIONS

"1st Office Action of China counterpart application", issued on May 8, 2009, p. 1-p. 5.
Office Action of Taiwan counterpart application, issued on Apr. 8, 2010, p. 1-p. 4.

* cited by examiner

*Primary Examiner* — Que T Le
*Assistant Examiner* — Jerry Brooks
(74) *Attorney, Agent, or Firm* — Jianq Chyun IP Office

(57) ABSTRACT

A projection apparatus includes a prism set, a light source, a reflective element, a light valve and a projection lens. The prism set includes a first prism having a first surface, a second surface and a third surface, and a second prism having a fourth surface opposite to the second surface, a fifth surface and a sixth surface. The reflective element, light valve and projection lens are respectively disposed adjacent to the third, fifth and sixth surfaces. The light source emits an illumination beam to the first surface. The non polarized illumination beam is reflected by the second surface and the reflective element. The non polarized illumination beam passes through the third, second, fourth and fifth surfaces in sequence. The non polarized illumination beam is converted by the light valve into an image beam which is reflected by the fourth surface and passes through the sixth surface to the projection lens in sequence.

11 Claims, 4 Drawing Sheets

US 8,104,898 B2

PROJECTION APPARATUS

CROSS-REFERENCE TO RELATED APPLICATION

This application claims the priority benefit of Taiwan application serial no. 96113780, filed on Apr. 19, 2007. All disclosure of the Taiwan application is incorporated herein by reference.

BACKGROUND OF THE INVENTION

1. Field of the Invention

The present invention relates to a display apparatus, and more particularly to a projection apparatus.

2. Description of Related Art

FIG. 1 is a schematic view of a conventional projection apparatus. Referring to FIG. 1, a conventional projection apparatus 100 includes a light source 110, lenses 120a, 120b, a reflecting mirror 130, a prism set 140, a digital micro-mirror device (DMD) 150 and a projection lens 160.

The prism set 140 is composed of a prism 142 and a prism 146, the prism 142 has surfaces 144a, 144b, 144c, and the prism 146 has surfaces 148a, 148b. The surface 144b is opposite to the surface 148b, and a gap exists between the surface 144b and the surface 148b. The prism 146 is used to compensate an optical path difference of lights in the prism 142.

The DMD 150 is disposed adjacent to the surface 144a, and the projection lens 160 is disposed adjacent to the surface 144c. The reflecting mirror 130 is disposed between the light source 110 and the prism set 140. The lens 120a is disposed between the light source 110 and the reflecting mirror 130, and the lens 120b is disposed between the reflecting mirror 130 and the prism set 140.

The light source 110 is capable of emitting an illumination beam B1, the illumination beam B1 is reflected by the reflecting mirror 130 after passing through the lens 120a. Then, the illumination beam B1 is incident into the prism 142 from the surface 148a after passing through the lens 120b, and passes through the surface 148b, the surface 144b, and the surface 144a in sequence to be transmitted to the DMD 150. The DMD 150 coverts the illumination beam B1 into an image beam B2, and reflects the image beam B2 back to the surface 144b. Next, the surface 144b reflects the image beam B2, such that the image beam B2 is incident into the projection lens 160 after passing through the surface 144c. The projection lens 160 is used for projecting the image beam B2 on a screen (not shown), so as to form an image on the screen.

In the conventional technique, the lens 120a and lens 120b are used for condensing the illumination beam B1 provided by the light source 110, such that the sectional area of the illumination beam B1 is identical to the area of an active surface of the DMD 150 when the illumination beam B1 is transmitted to the DMD 150. Therefore, the projection apparatus 100 is required to have an enough internal space to ensure enough path length of the illumination beam B1, so as to make the sectional area of the illumination beam B1 to be identical to the area of the active surface. In other words, in the architecture of the conventional projection apparatus 100, for ensuring the illumination beam B1 having an enough path length, the distance between the elements cannot be shortened. Therefore, obviously, the architecture of the conventional projection apparatus 100 cannot satisfy the current trend in pursuit of the projection apparatus with a small volume.

SUMMARY OF THE INVENTION

The present invention is directed to providing a projection apparatus advantageous in small volume.

Other advantages of the present invention can be further understood from the technical features disclosed by the present invention.

In order to achieve one or part of or all advantages or other advantages, a projection apparatus including a prism set, a light source, a reflective element, a light valve, and a projection lens is provided. The prism set includes a first prism and a second prism. The first prism has a first surface, a second surface, and a third surface, and the second prism has a fourth surface, a fifth surface, and a sixth surface. The second surface is opposite to the fourth surface. The light source provides an illumination beam, and the illumination beam is incident into the first prism from the first surface, and is reflected by the second surface and emitted from the third surface. The reflective element is disposed adjacent to the third surface, and is located on a transmission path of the illumination beam. After the illumination beam is reflected by the reflective element, the illumination beam passes through the third surface, the second surface, the fourth surface, and the fifth surface in sequence. The light valve is disposed adjacent to the fifth surface, and is located on the transmission path of the illumination beam reflected by the reflective element. The illumination beam is converted by the light valve into an image beam, and the image beam is reflected by the light valve back to the fourth surface. After the image beam is reflected by the fourth surface, the image beam passes through the sixth surface. The projection lens is disposed adjacent to the sixth surface, and is located on a transmission path of the image beam.

In an embodiment of the present invention, as the illumination beam goes to and fro between the third surface and the reflective element, the space for the transmission of the illumination beam is shortened, thereby reducing the volume of the projection apparatus according to the present invention.

Other features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The First Embodiment

Figure 2:
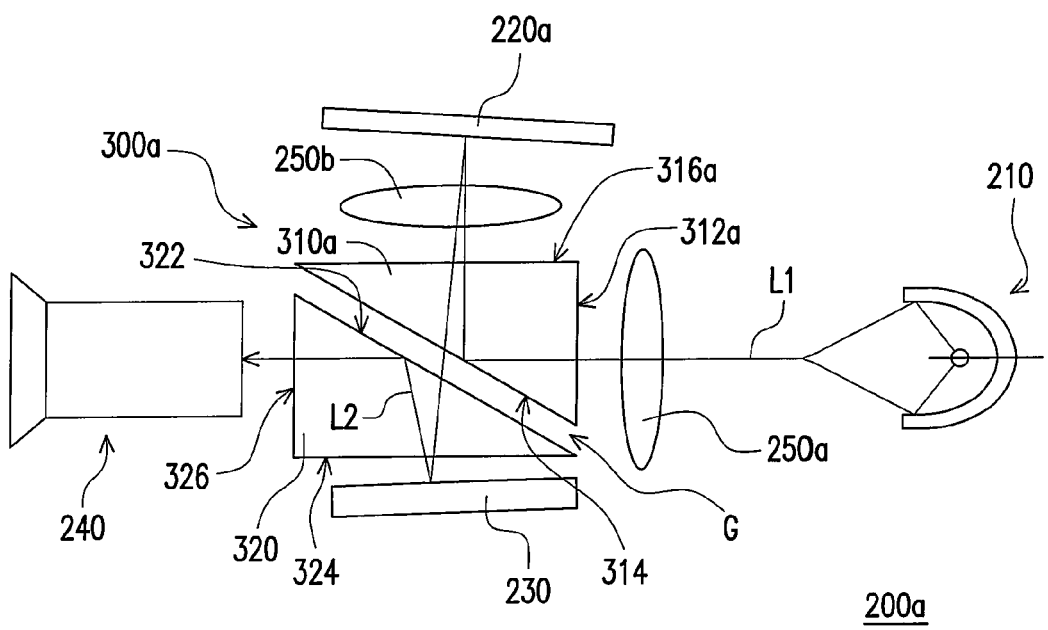
FIG. 2 is a schematic view of a projection apparatus according to a first embodiment of the present invention.

FIG. 2 is a schematic view of a projection apparatus according to a first embodiment of the present invention. Referring to FIG. 2, the projection apparatus 200a includes a light source 210, a reflective element 220a, a light valve 230, a projection lens 240, and a prism set 300a. The prism set 300a includes a first prism 310a and a second prism 320. The first prism 310a has a first surface 312a, a second surface 314, and a third surface 316a, and the second prism 320 has a fourth surface 322, a fifth surface 324, and a sixth surface 326. The second surface 314 is opposite to the fourth surface 322. In this embodiment, a gap G exists between the second surface 314 and the fourth surface 322. Moreover, the reflective element 220a is disposed adjacent to the third surface 316a, the light valve 230 is disposed adjacent to the fifth surface 324, and the projection lens 240 is disposed adjacent to the sixth surface 326.

The light source 210 is capable of emitting an illumination beam L1. The illumination beam L1 is incident into the first prism 310a from the first surface 312a, and is reflected by the second surface 314 and emitted from the third surface 316a. The reflective element 220a is disposed adjacent to the third surface 316a and located on a transmission path of the illumination beam L1. After the illumination beam L1 is reflected by the reflective element 220a, the illumination beam L1 passes through the third surface 316a, the second surface 314, the fourth surface 322, and the fifth surface 324 in sequence. The light valve 230 is disposed adjacent to the fifth surface 324 and located on the transmission path of the illumination beam L1 reflected by the reflective element 220a. When the illumination beam L1 passes through the fifth surface 324, the illumination beam L1 is converted by the light valve 230 into an image beam L2 and the image beam L2 is reflected by the light valve 230 back to the fourth surface 322. Afterward, the image beam L2 is reflected by the fourth surface 322, and then the image beam L2 passes through the sixth surface 326 to the projection lens 240. The projection lens 240 located on a transmission path of the image beam L2 projects the image beam L2 onto a screen (not shown), so as to form an image on the screen.

The light valve 230 is a reflective light valve, such as a DMD or a liquid crystal on silicon panel (LCOS panel). Moreover, the reflective element 220a is, for example, a plane reflecting mirror.

In the projection apparatus 200a, the illumination beam L1 is reflected by the second surface 314 back to the reflective element 220a, and then reflected by the reflective element 220a back to the second surface 314. In other words, in this embodiment, the illumination beam L1 go to and fro between the second surface 314 and the reflective element 220a, so as to effectively reduce the space for the transmission of the illumination beam L1, thereby reducing the volume of the projection apparatus 200a.

Figure 1:
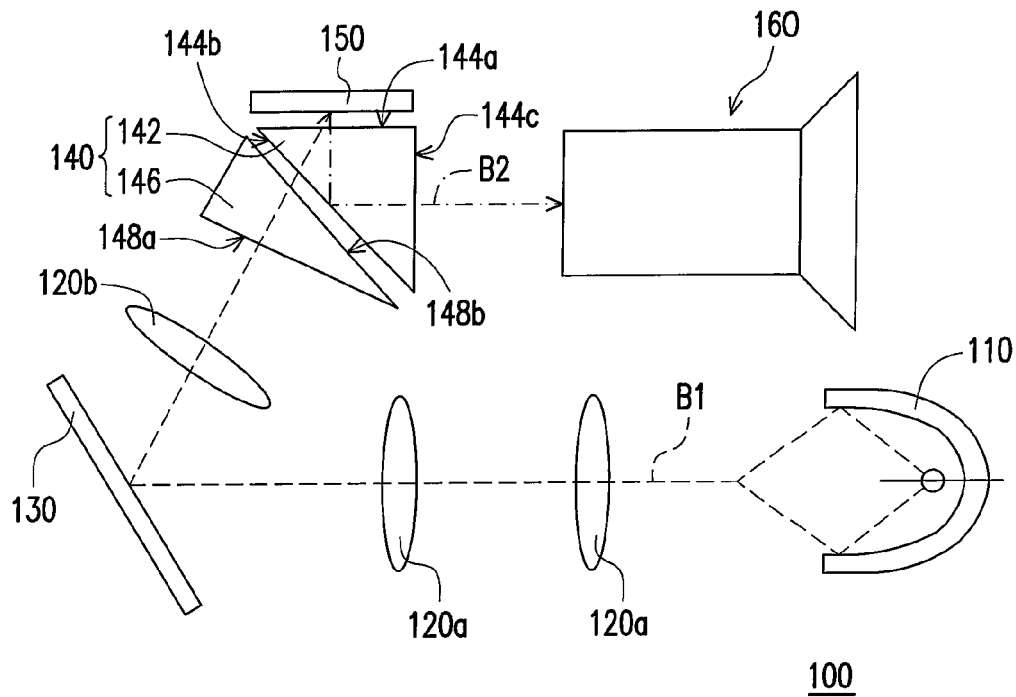
FIG. 1 is a schematic view of a conventional projection apparatus.

In this embodiment, at least one light condensing element (e.g., a lens 250a) is disposed between the light source 210 and the first surface 312a of the first prism 310a, so as to condense the illumination beam L1. Moreover, at least one light condensing element (e.g., lens 250b) is also disposed between the reflective element 220a and the third surface 316a of the first prism 310a, located on the transmission path of the illumination beam L1 emitted from the third surface 316a, and located on the transmission path of the illumination beam L1 reflected from the reflective element 220a, so as to condense the illumination beam L1. As the illumination beam L1 goes to and fro between the second surface 314 of the first prism 310a and the reflective element 220a, the illumination beam L1 passes through the lens 250b twice. In other words, the lens 250b condenses the illumination beam L1 twice, thus reducing the number of the lens. Therefore, compared with the conventional projection apparatus 100 (as shown in FIG. 1), the projection apparatus 200a according to the present invention has less optical elements. In such a manner, the manufacturing cost is reduced, and the space occupied by the optical elements is also reduced, thereby reducing the volume of the projection apparatus 200a.

The Second Embodiment

Figure 3:
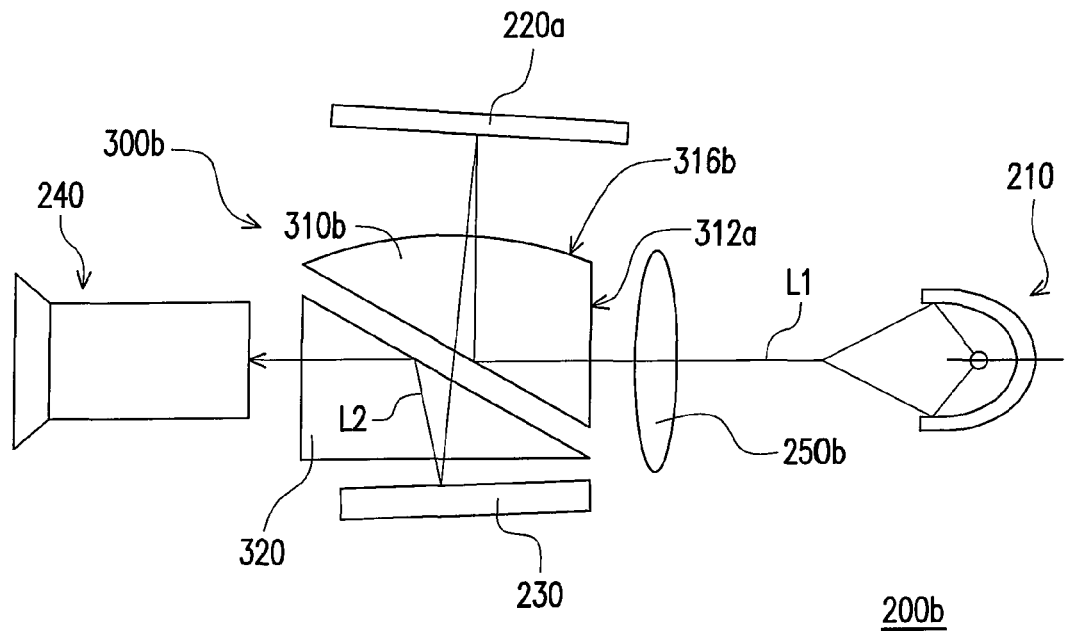
FIG. 3 is a schematic view of a projection apparatus according to a second embodiment of the present invention.

FIG. 3 is a schematic view of a projection apparatus according to a second embodiment of the present invention. Referring to FIG. 3, the projection apparatus 200b of this embodiment is similar to the projection apparatus 200a (as shown in FIG. 2) of the first embodiment, and the main difference lies in the prism set. Only the difference is illustrated hereinafter.

A first surface 312a of a first prism 310b of a prism set 300b in this embodiment is a plane surface, and a third surface 316b is a curved surface. The third surface 316b is capable of condensing the illumination beam L1 reflected by the reflective element 220a. Since the third surface 316b has a function of light condensing, the number of the light condensing elements is reduced, such that the cost of the light condensing elements is reduced, and the space occupied by the light condensing elements is also reduced. Therefore, the projection apparatus 200b is advantageous in small volume and low cost.

Definitely, in this embodiment, light condensing elements are also disposed between the third surface 316b and the reflective element 220a. Therefore, the projection apparatus 200b shown in FIG. 3 is illustrated as an example, and is not intended to limit the present invention.

The Third Embodiment

Figure 4:
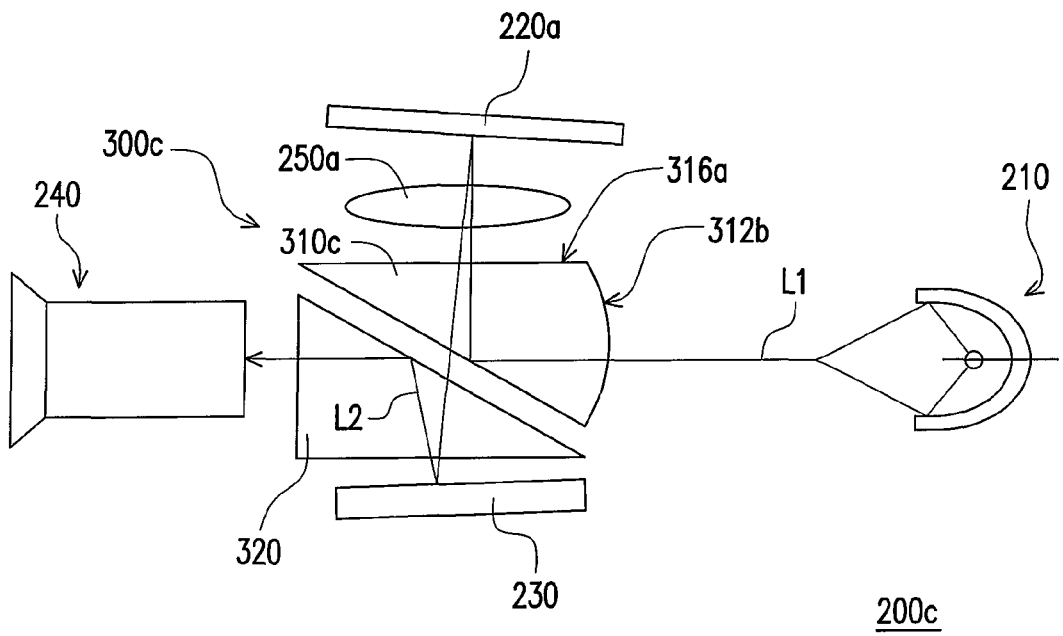
FIG. 4 is a schematic view of a projection apparatus according to a third embodiment of the present invention.

FIG. 4 is a schematic view of a projection apparatus according to a third embodiment of the present invention. Referring to FIG. 4, the projection apparatus 200c of this embodiment is similar to the projection apparatus 200a (as shown in FIG. 2) of the first embodiment, and the main difference lies in the prism set. Only the difference is illustrated hereinafter.

A third surface 316a of a first prism 310c of a prism set 300c in this embodiment is a plane surface, and a first surface 312b is a curved surface capable of condensing the illumination beam L1. Since the first surface 312b is capable of condensing the illumination beam L1, the number of the light condensing elements is reduced, thereby reducing the manufacturing cost.

In this embodiment, at least one light condensing element is disposed between the first surface 312b and the light source 210. Therefore, the projection apparatus 200c shown in FIG. 4 is illustrated as an example, and is not intended to limit the present invention.

The Fourth Embodiment

Figure 5:
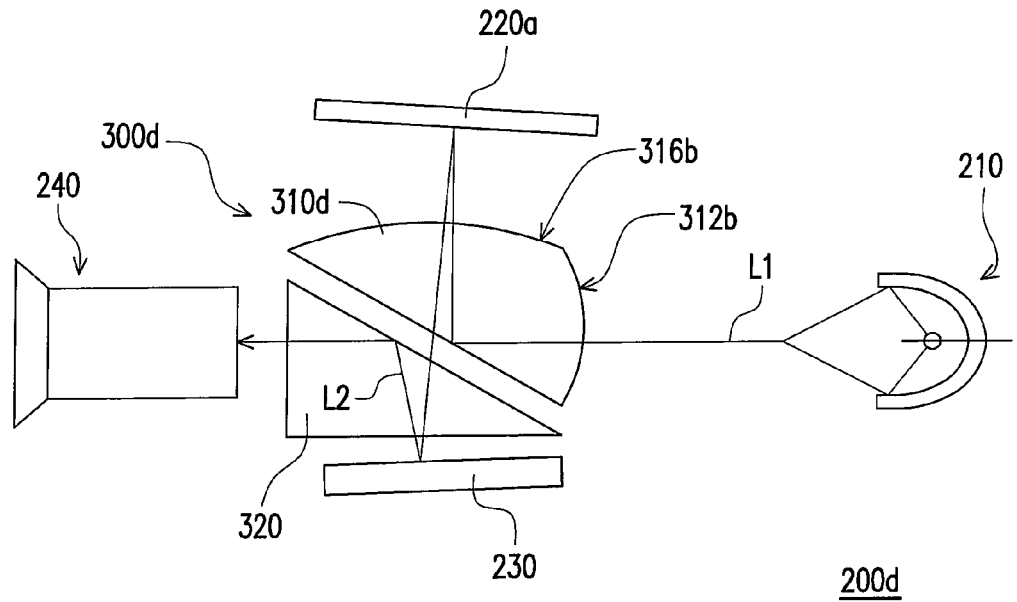
FIG. 5 is a schematic view of a projection apparatus according to a fourth embodiment of the present invention.

FIG. 5 is a schematic view of a projection apparatus according to a fourth embodiment of the present invention. Referring to FIG. 5, the projection apparatus 200d of this embodiment is similar to the projection apparatus 200a (as shown in FIG. 2) of the first embodiment, and the main difference lies in the prism set. Only the difference is illustrated hereinafter.

A first surface 312b and a third surface 316b of a first prism 310d of a prism set 300d in this embodiment are all curved surfaces. The first surface 312b and the third surface 316b are all capable of condensing the illumination beam L1, such that the number of the light condensing elements is reduced, thereby reducing the manufacturing cost.

In this embodiment, at least one light condensing element is disposed between the first surface 312b and the light source 210 and/or between the third surface 316b and the reflective element 220a. In particular, at least one lens is disposed between the first surface 312b and the light source 210, so as to condense the illumination beam L1, and at least one lens is also disposed between the third surface 316b and the reflective element 220a, so as to condense the illumination beam L1. Therefore, the projection apparatus 200d shown in FIG. 5 is illustrated as an example, and is not intended to limit the present invention.

The Fifth Embodiment

Figure 6:
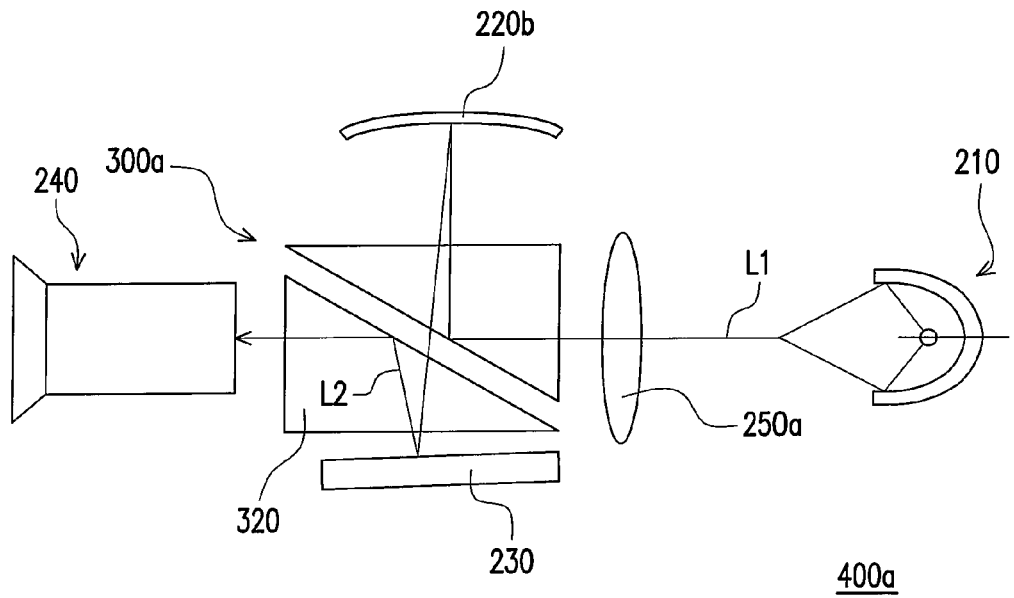
FIG. 6 is a schematic view of a projection apparatus according to a fifth embodiment of the present invention.

FIG. 6 is a schematic view of a projection apparatus according to a fifth embodiment of the present invention. Referring to FIG. 6, the projection apparatus 400a of this embodiment is similar to the projection apparatus 200a (as shown in FIG. 2) of the first embodiment, and the main difference lies in the prism set. Only the difference is illustrated hereinafter.

A reflective element 220b of this embodiment is a curved reflecting mirror, capable of reflecting and condensing the illumination beam L1. In other words, the reflective element 220b of this embodiment has a function of light condensing, such that the number of the light condensing elements is reduced, thereby reducing the manufacturing cost. Moreover, other light condensing elements are also disposed between the reflective element 220b and the prism set 300a. Therefore, the projection apparatus 400a shown in FIG. 6 is illustrated as an example, and is not intended to limit the present invention.

The Sixth Embodiment

Figure 7:
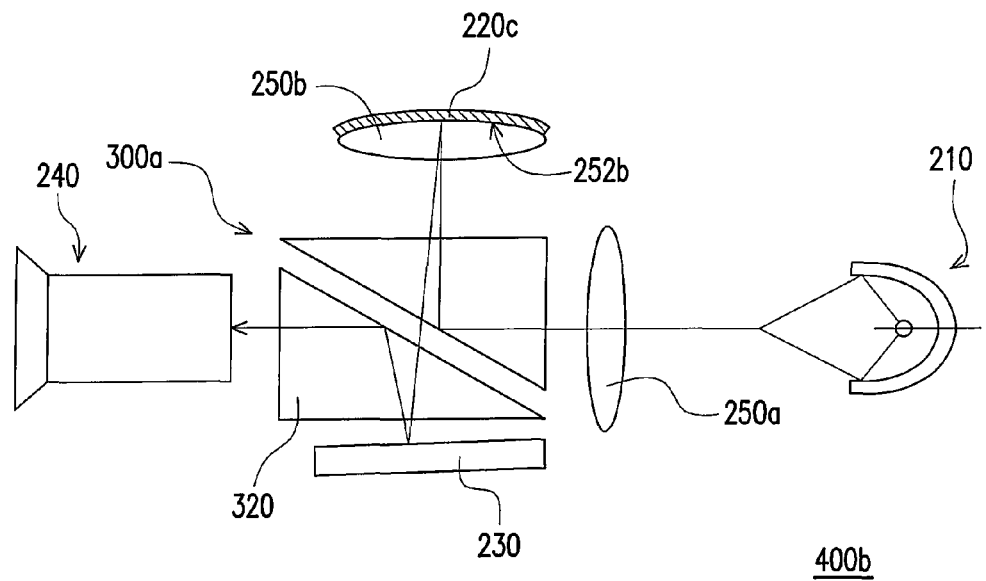
FIG. 7 is a schematic view of a projection apparatus according to a sixth embodiment of the present invention.

FIG. 7 is a schematic view of a projection apparatus according to a sixth embodiment of the present invention. Referring to FIG. 7, the projection apparatus 400b of this embodiment is similar to the projection apparatus 200a (as shown in FIG. 2) of the first embodiment, and the difference lies in that a reflective element 220c of this embodiment is a coating layer applied on a surface 252b of the lens 250b, and the coating layer is made of, for example, metal or another reflective material.

The Seventh Embodiment

Figure 8:
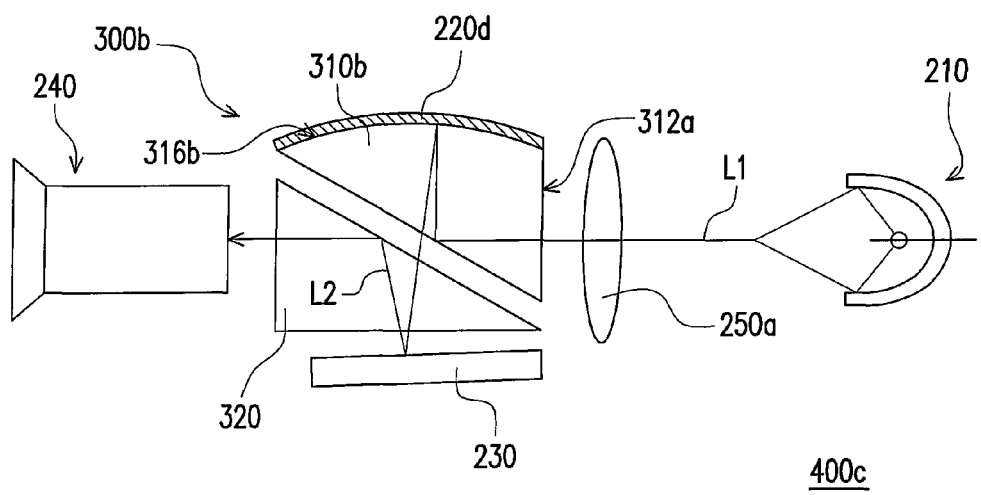
FIG. 8 is a schematic view of a projection apparatus according to a seventh embodiment of the present invention.

FIG. 8 is a schematic view of a projection apparatus according to a seventh embodiment of the present invention. Referring to FIG. 8, the projection apparatus 400c of this embodiment is similar to the projection apparatus 200b (as shown in FIG. 3) of the second embodiment, and the difference lies in that a reflective element 220d of this embodiment is a coating layer applied on a third surface 316b, and the coating layer is made of, for example, metal or another reflective material.

Moreover, the advantages of the projection apparatus 400b, 400c are similar to those of the projection apparatus 200a in the first embodiment, thus the details will not be described herein.

In view of the above, in the present invention, the illumination beam goes to and fro between the third surface and the reflective element, such that the space required by the illumination beam for transmission is reduced, thereby reducing the volume of the projection apparatus of the present invention. Moreover, the lens disposed between the reflective element and the first prism condenses the light beam twice, and thus the number of the light condensing elements is reduced, thereby reducing the manufacturing cost.

The foregoing description of the preferred embodiment of the invention has is been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the is public regardless of whether the element or component is explicitly recited in the following claims.

What is claimed is:

1. A projection apparatus, comprising:
  a prism set, comprising:
    a first prism, having a first surface, a second surface, and a third surface;
    a second prism, having a fourth surface, a fifth surface, and a sixth surface, wherein the second surface is opposite to the fourth surface, and a gap exists between the second surface and the fourth surface;
  a light source, providing a non polarized illumination beam, wherein the non polarized illumination beam is incident into the first prism from the first surface, and is reflected by the second surface to be emitted from the third surface;
  a reflective element, disposed adjacent to the third surface and located on a transmission path of the non polarized illumination beam, after the non polarized illumination beam is reflected by the reflective element, the non polarized illumination beam passes through the third surface, the second surface, the fourth surface, and the fifth surface in sequence;
  a digital micro-mirror device, disposed adjacent to the fifth surface and located on the transmission path of the non polarized illumination beam reflected by the reflective element, wherein the non polarized illumination beam is converted by the digital micro-mirror device into a non polarized image beam and the non polarized image beam is reflected by the digital micro-mirror device back to the fourth surface, after the non polarized image beam is reflected by the fourth surface, the non polarized image beam passes through the sixth surface;
  a projection lens, disposed adjacent to the sixth surface and located on a transmission path of the non polarized image beam; and
  a lens, disposed between the third surface and the reflective element, and located on the transmission path of the non polarized illumination beam emitted from the third surface and on the transmission path of the non polarized illumination beam reflected by the reflective element, to condense the non polarized illumination beam.

2. The projection apparatus as claimed in claim 1, further comprising a lens, disposed between the first surface and the light source to condense the non polarized illumination beam.

3. The projection apparatus as claimed in claim 2, further comprising a lens disposed between the third surface and the reflective element and located on the transmission path of the non polarized illumination beam emitted from the third surface and located on the transmission path of the non polarized illumination beam reflected by the reflective element, to condense the non polarized illumination beam.

4. The projection apparatus as claimed in claim 1, wherein the first surface is a plane surface.

5. The projection apparatus as claimed in claim 1, wherein the first surface is a curved surface, and the first surface is capable of condensing the non polarized illumination beam.

6. The projection apparatus as claimed in claim 1, wherein the reflective element is a coating layer formed on a surface of the lens.

7. The projection apparatus as claimed in claim 1, wherein the reflective element is a plane reflecting mirror.

8. The projection apparatus as claimed in claim 1, wherein the reflective element is a curved reflecting mirror.

9. The projection apparatus as claimed in claim 1, wherein the third surface is a plane surface.

10. The projection apparatus as claimed in claim 1, wherein the third surface is a curved surface, and the third surface is capable of condensing the non polarized illumination beam reflected by the reflective element.

11. The projection apparatus as claimed in claim 10, wherein the reflective element is a coating layer disposed on the third surface.

* * * * *